United States Patent [19]

Maffitt et al.

[11] 4,430,659
[45] Feb. 7, 1984

[54] PROTUBERANT OPTICAL RECORDING MEDIUM

[75] Inventors: Kent N. Maffitt, Minneapolis; William B. Robbins, Maplewood, both of Minn.; Richard F. Willson, Hudson, Wis.

[73] Assignee: Minnesota Mining and Manufacturing Company, St. Paul, Minn.

[21] Appl. No.: 234,111

[22] Filed: Feb. 13, 1981

[51] Int. Cl.³ ............................................. G01D 15/34
[52] U.S. Cl. ................................ 346/135.1; 365/113; 369/84; 369/100; 369/284; 430/945
[58] Field of Search ...................... 346/135.1, 76 L; 365/113, 114; 369/275, 100, 84, 284; 430/945, 290, 321

[56] References Cited

U.S. PATENT DOCUMENTS

| | | | |
|---|---|---|---|
| 3,226,696 | 12/1965 | Dove | 365/128 |
| 3,636,526 | 1/1972 | Feinleib | . |
| 3,654,864 | 4/1972 | Oushinsky | 346/76 L X |
| 3,716,844 | 2/1973 | Brodsky | 430/945 X |
| 3,747,117 | 7/1973 | Fechter | 346/76 L |
| 3,954,469 | 5/1976 | Avanzado | 369/275 X |
| 4,069,487 | 1/1978 | Kasai | 346/76 L |
| 4,232,337 | 11/1980 | Winslow | 358/128.5 |
| 4,285,056 | 8/1981 | Bell | 369/100 |
| 4,300,227 | 11/1981 | Bell | 369/100 X |

FOREIGN PATENT DOCUMENTS

| | | |
|---|---|---|
| 22313 | 1/1981 | European Pat. Off. . |
| 1571948 | 7/1980 | United Kingdom . |
| 2061595 | 5/1981 | United Kingdom . |

OTHER PUBLICATIONS

Carlson and Ives; Some Considerations in the Design of a Laser Thermal Microimage Recorder, Wescon Technical Papers, vol. 72, 1968.
Congleton et al.; A Comparison of Plastic Versus Metal Coatings for Real Time Laser Recording, JAPE, vol. 3, No. 2, Spring 1977, pp. 97–105.
Bell et al; Antireflection Structures for Optical Recording; IEEE Journal of Quantum Electronics; vol. QE-14, No. 7, Jul. 1978, pp. 487–495.
Bartolini et al.; Optical Disk Systems Emerge; IEEE Spectrum, vol. 15, No. 8, Aug. 1978, pp. 20–28.
Bell et al.; Optical Recording with the Encapsulated Titanium Trilayer; RCA Review, vol. 40, Sep. 1979, pp. 345–362.
Corcoran et al.; Melting Holes . . . Data Storage; SPIE, vol. 123, Optical Storage Materials and Methods, (1977), pp. 17–31.
Myers et al.; Laser Micrographic Recording on Non Silver Halide Media; Journal of Micrographics, vol. 8, No. 6, Jul. 1975, pp. 265–273.

*Primary Examiner*—Joseph W. Hartary
*Attorney, Agent, or Firm*—Donald M. Sell; James A. Smith; William B. Barte

[57] ABSTRACT

An optical recording medium containing a light-absorbing film of amorphous carbon less than 60 nm thick and which is sufficiently plastic to allow plastic information upon localized heating is provided for exposure to a focused laser beam, whereupon localized heating of the light-absorbing film enables information storage in the form of localized protuberances in the heated areas which can subsequently be optically detected and can be used as a master information record for replication purposes.

18 Claims, 4 Drawing Figures

PROTUBERANT OPTICAL RECORDING MEDIUM

DESCRIPTION

1. Technical Field

This invention relates to a recording system in which information is to be optically recorded with a focused laser on a medium containing a radiation absorbing film, and in particular to such a system wherein no development of the recording medium is necessary after exposure such that the medium is available for playback immediately after exposure, i.e. direct-read-after-write.

2. Background Art

While optical recording, i.e. the recording and playback of information using a focused beam of light, was first proposed long ago, it required the development of low cost, practical lasers to make such a concept a commercial reality. Today, vast sums have been and are being invested in research and development aimed at developing more sensitive media, media having higher resolution, systems having improved capabilities of coping with physical irregularities, etc. A useful review of what may reflect the state-of-the-art in many competing media for optical recording is presented in the article "Optical Disk Systems Emerge", by R. A. Bartolini et al, IEEE Spectrum, Vol. 15, No. 8, pages 20–28, August 1978, at page 22, of which is set forth a table comparing various candidate materials and media. A particularly desirable medium which bears certain similarities to the present invention is discussed at page 26 thereof. The medium there discussed includes a thin layer of metal such as titanium, which upon impact of a laser beam, melts (the melting point of Ti is 1668° C.) to form a crater pit; thus allowing a reflectorized layer therebelow to become visible.

Optical recording media utilizing thin metallic films which form pits upon recording are further discussed in the article "Optical Recording with the Encapsulated Titanium Trilayer", by A. E. Bell et al, RCA Review, Vol. 40, pages 345–362, September, 1979. That article notes that dust particles tend to degrade the media after fabrication, and proposes that the media be encapsulated with a silicone rubber formulation (such as G. E. RTV 615B) to protect the surface. However, due to the high temperature present at which the Ti layer melts to form the crater pits, it is further said to be necessary to thermally isolate the protective overcoat by providing a silicon dioxide thermal barrier layer between the Ti absorber layer, and the overcoat. At page 359 the authors report on recordings made after deposition of the silicon dioxide overcoat thermal barrier layer, but prior to application of the RTV coating, and observed that "some distortion of the silicon dioxide layer has occurred, resulting in the formation of raised bubbles in the regions where the titanium layer has been melted."

A further mention of the formation of domes in the process of melting a thin metallic film upon laser impingement to form holes for digital data storage is found in the article "Melting Holes in Metal Films for Real-Time, High-Density, Permanent Digital Data Storage", by Messrs. John Corcoran and Herman Ferrier, Proceedings of the Society of Photo-Optical Instrumentation Engineers, Vol. 123, pages 17–31. At page 19 thereof are reported results obtained upon laser impingement on experimental media constructed of a substrate of glass on which an 80 nm thin film of chromium was deposited and on top of which was a layer of collodion (a viscous solution of pyroxylin, a cellulose nitrate mixture). When a laser beam limited in intensity to a point where resultant holes could not be detected optically was directed onto the Cr film, dimples in the outer surface were detected upon SEM examination. When the collodion layer was stripped off and the Cr layer alone exposed as before, domes having a radius of approximately one micrometer were detected via scanning electron microscopy. The authors postulated that both the dimples and domes resulted from gaseous decomposition products formed when the Cr film melted, and which, given slightly more energy, would produce holes.

The use of thin metal or metal-like films in direct-read-after-write recording media in which the films are caused to melt or ablate to form holes or pits likewise is disclosed in numerous patents, none of which, however, contains any suggestion as to the formation of bubbles, domes, protuberances, or the like, on the surface of the media. See, for example, U.S. Pat. Nos. 3,560,994 (Wolff & Hanisch), 3,720,784 (Maydan et al), 3,787,873 (Sato), 3,889,272 (Lou), 3,911,444 (Lou), 4,000,492 (Willens), 4,023,185 (Bloom et al), 4,069,487 (Kasai et al), 4,097,895 (Spong), 4,101,907 (Bell and Bartolini), 4,137,077 (Credelle et al), 4,139,853 (Ghekiere et al), 4,141,731 (Jarsen), 4,176,377 (Howe), 4,188,214 (Kido et al), 4,189,735 (Bell et al), 4,195,312 (Bell et al), 4,195,313 (Bell et al.), 4,211,617 (Hunyar), 4,216,501 (Bell), and UK Pat. No. 1,571,948 (Thomson-Brandt).

These patents are primarily directed to media which include light-absorbing films of low melting point metals such as Bi, Pb and Sn, and those of moderate melting point metals such as Ti, but in which refractory materials would normally be undesirable. This undesirability is evident in that the amount of energy required to melt the material and to form the pits or craters, i.e. the recording threshold, would be excessively high, thus resulting in a recording medium with a lower equivalent sensitivity, assuming that all other parameters in the media were the same, i.e. that the respective media likewise include or do not include such sensitivity affecting elements as light reflecting underlayers, antireflecting overlayers, interferometric dimensions to optimize absorption and/or reflection, etc.

Of the above listed patents, U.S. Pat. No. 4,069,487 (Kasai et al) is particularly relevant to the present invention, as it suggests that the recording layer in which pits or holes are to be formed by vaporization and/or melting is composed of a non-metallic material which absorbs the laser beam efficiently. Representative non-metallic materials are said to include inorganic oxides, chalcogen compounds and resins, relatively high sensitivity materials being suggested to include lead oxide, tungsten oxide, titanium oxide, silicon oxide, zirconium oxide, and the like. The melting points of these oxides are believed to be approximately 1160 K, 1740 K, 2110 K, 1980 K and 2970 K, respectively, such that some of them may be said to be a refractory material as defined below. Such oxides are said to be usable alone as the light-absorbing layer, as in Example 4 thereof, wherein a 300 nm layer of $WO_3$ was deposited, as well as when laminated with a metallic layer, as in Example 4, wherein a 60 nm thick layer of $TiO_2$ was deposited on top of 100 nm thick layer of Au. The pertinent figures of that reference depict holes or pits formed during recording as extending through such laminate constructions to expose the support therebelow. The patent thus totally fails to suggest formation of protuberances during recording.

Optical recording media which include oxygen deficient oxides of Ti, Fe, Cr, Mn, Pb, and Zr are disclosed in UK Pat. No. 1,571,948, wherein recording under a laser beam is said to produce localized changes in the index of refraction. While certain of those oxides may likewise be considered to be refractory, the patent contains no suggestion of the formation of protuberances.

DISCLOSURE OF INVENTION

The various media discussed in the references noted above for use with a focused laser beam all include a light-absorbing layer which is locally melted or evaporated as a result of light absorbed from the laser beam, thus providing information storage in the form of holes or pits. In contrast, the medium of the present invention includes a substrate and a light-absorbing layer adjacent thereto wherein the light-absorbing layer comprises amorphous carbon, having a thickness of less than 60 nm, and has a plasticity sufficient to allow plastic deformation upon localized heating resulting from impingement by a focused laser beam to enable the formation of localized protuberances which can subsequently be optically detected. In one preferred embodiment, the medium includes a reflecting layer between the substrate and the light-absorbing layer, wherein the total optical thickness of the absorbing layer is such as to result in an interferometric, substantially antireflecting structure when in the undeformed state, and wherein the subsequently formed protuberances possess appreciably increased effective optical thickness. Such a reflecting layer may, for example, be a thin film of Al, Cr, Cu, Au, Ag, stainless steels or Ti.

In another embodiment, an optical spacer layer may be provided below the light-absorbing layer, and which in combination therewith provides an interferometric antireflecting structure. Preferably, however, such a spacer layer is sandwiched between a reflector layer and the light-absorbing layer to form an efficient light-absorbing trilayered structure which exhibits optimum sensitivity. Such a structure is, for example, desirably formed to exhibit multiple-interferometric orders.

While not bound to the theory of operation of the invention, it is believed that the formation of protuberances in the medium of the present invention during recording thereon with a focused laser beam occurs as a result of the presence of gas in the localized regions impinged upon by the laser beam. Thus, for example, the medium desirably includes as the optical spacer layer noted above, a material which readily provides a gas upon localized heating resulting during laser beam impingement. While a separate gas-generating or providing layer is believed to be preferred, it is also recognized that the gas may be provided even without a separate layer for that purpose. For example, sufficient gas may be generated via partial decomposition of either the substrate, reflector layer, etc.

Another aspect of the present invention is found in the method for recording information, wherein there is first provided a medium such as described earlier, i.e. one comprising a layer less than 60 nm thick of a refractory material having a plasticity sufficient to allow plastic deformation upon localized heating. The medium is then exposed to a focused laser beam of limited but sufficient power and duration to enable light absorbed therefrom in localized regions to form on the surface of the light-absorbing layer a plurality of optically detectable localized protuberances, which protuberances form a pattern representing information recorded therein.

A particularly desirable aspect of the present invention is that the protuberances possess appreciable height, thus forming an information record which is both directly optically detectable, thereby enabling the use of the record in direct-read-after-write applications, and which is also usable as a master record from which replicas may be directly formed. In a further process, such replicas may be formed by thereafter placing the surface containing the protuberances in contact with a polymeric material or precursor thereof to form replicas of said protuberant pattern on a surface of the polymeric material.

DESCRIPTION OF THE PREFERRED EMBODIMENTS

Figure 1:
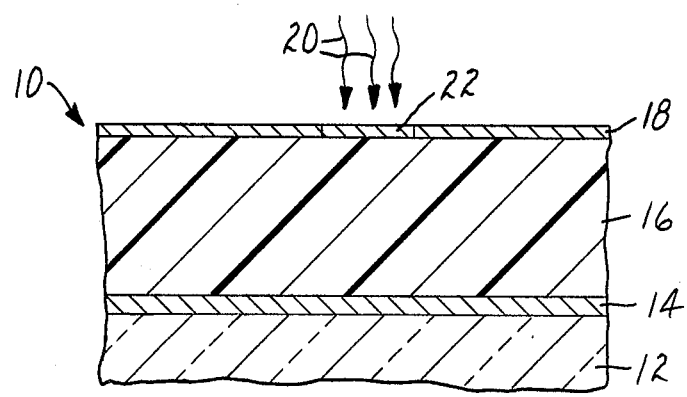
FIG. 1 is a cross-section of one embodiment of a recording medium of the present invention.

Referring to FIG. 1, it may be seen that a recording medium 10 according to a preferred embodiment includes a substrate 12 upon which is deposited a reflecting layer 14 and thereover an optical spacer 16, on top of which is deposited a light-absorbing layer 18. A laser beam 20 is applied to the recording medium modulated in accordance with the information to be recorded thereon, and the irradiated portion 22 becomes deformed to form protuberances representative of the recorded information.

In various embodiments of the present invention, the thicknesses of the various layers may vary over considerable ranges. Thus, for example, in FIG. 1, the reflecting layer 14 is shown to be relatively thin, for example, a layer of evaporated aluminum, approximately 30 nm thick, while the optical spacer layer 16 is appreciably thicker, for example, a layer of an acrylate polymer approximately 250 nm thick, and the light-absorbing layer 18, is also relatively thin, for example, a deposited film of amorphous carbon, approximately 15 nm thick.

Figure 2:
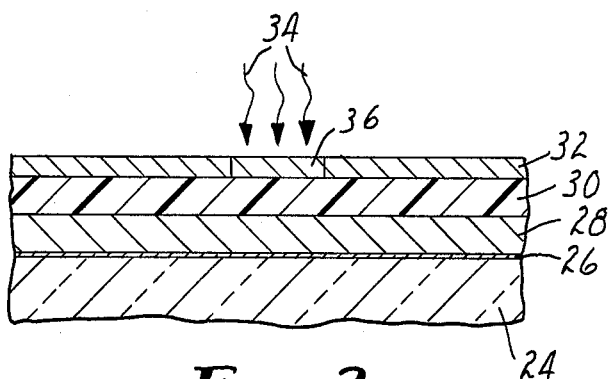
FIG. 2 is a cross-section of another embodiment of a recording medium of the present invention.

In another embodiment, the thicknesses of the respective layers may be as shown in FIG. 2, wherein the substrate 24 is shown to have first deposited thereon a primer layer 26, such as a suboxide of titanium as having a thickness of approximately 3 nanometer. On top of the primer layer 26 is then deposited a reflecting layer 28 such as the 30 nm thick layer of aluminum shown in FIG. 1. An optical spacer layer 30 overlying the reflecting layer 28 may also be an acrylate polymer but in this embodiment has a thickness of only approximately 30 nm. Finally, like that of the example of FIG. 1, the light-absorbing layer 32 may again be a thin film of carbon, having a thickness of approximately 15 nanometers.

As shown in both FIGS. 1 and 2, the respective thicknesses of the optical spacer layer and the light absorbing layer are desirably tailored such that in combination the effective optical thickness possesses interferometric properties resulting in an antireflecting structure which exhibits maximum optical absorption at a given wavelength. In the particular embodiment shown in FIG. 1, the thickness of the optical spacer layer 16 has been adjusted relative to that of the absorbing layer 18 so as to exhibit reflection minimum at 520 and 1560 nanometers. In contrast, the relative dimensions of the spacer and absorber layers shown in FIG. 2 are such as to exhibit a single reflection minimum at approximately 500 nanometers. In both cases, the effective optical thickness obtained by those layers in combination is selected so as to provide minimum reflectance and hence maximum absorption at an incident wave length of approximately 500 nanometers.

Figure 3:
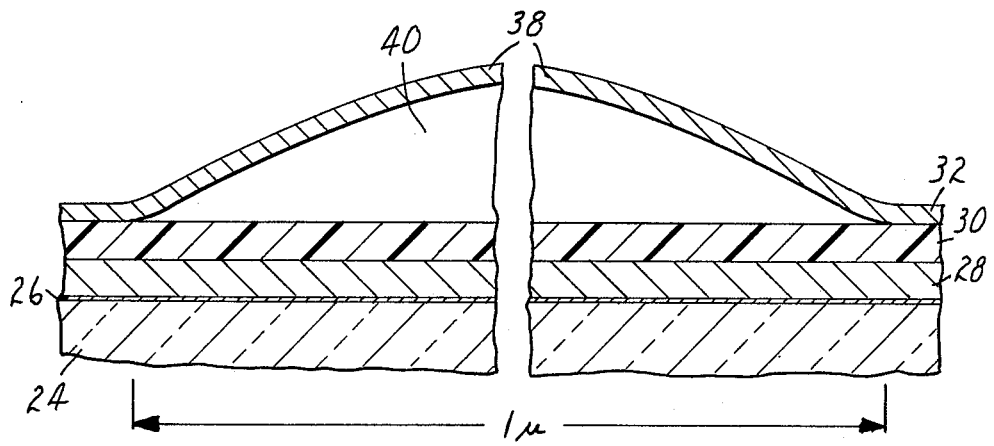
FIG. 3 is a cross-section of the recording medium of FIG. 2, showing a protuberance formed therein.

In contrast to the media described in the previously acknowledged references, the medium of the present invention utilizes a light absorbing layer containing refractory material sufficiently thin to have a degree of plasticity sufficient to allow deformation upon localized heating due to an impinging laser beam. This in turn enables the formation of a protuberance or bubble upon exposure to a localized, focused laser beam, as opposed to the formation of pits or holes as in the prior art references. This action is shown in FIG. 3, wherein a medium like that of FIG. 2 has been thus exposed and caused to form a protuberance 38 such that it separates from the optical spacer layer 30 forming a gas filled zone 40 therebetween. As further shown in FIG. 3, the horizontal dimensions of the protuberance 38 may typically have dimensions on the order of 1 micron. FIG. 3 thus shows the relative dimensions of the respective layers in scale, while the center portion of the protuberance is cut away.

The protuberance forming media of the present invention are particularly desirable over pit or hole forming media in that the protuberances are readily optically detectable. Where the media are constructed to have antireflecting interferometric dimensions, the resultant protuberances destroy the antireflecting characteristics. In particular, the peaks are desirably of a height, such as the approximate height of 120 nm shown in FIG. 3, that not only is the reflection minimum normally obtained in the undeformed regions destroyed, but an interferometric reflection maximum obtained at the peak of the protuberance, thus resulting in an optimally high carrier-to-noise ratio between the undeformed and protuberant regions.

A high carrier-to-noise ratio has thus been found to be characteristic of the media of the present invention, it typically being 10 to 15 db greater than that observed for comparable pit or hole forming media. This unexpected result is particularly believed due to the uniformly varying profile of the protruberances, as opposed to the irregular shapes and debris containing pits or holes formed in the prior art media.

As noted above, the formation of the protuberances is believed due to the generation of gas at the interface at the lower surface of the light absorbing layer. Thus the optical spacer layer preferably provided below the absorbing layer is selected of a material which readily releases gas upon localized heating. Desirable materials thus selected for that layer include organic materials such as an acrylate polymer, polystyrene, and like materials which may be deposited or applied in a variety of methods as set forth in the Examples hereafter. While polymeric materials are preferred for their low conductivity and thermal diffusivity properties and for their ability to readily release gas at low temperatures, it is similarly appreciated that various inorganic materials may be used. For example, deposited layers of Al and $SiO_2$ have been found to be a satisfactory gas provider. Such layers may contain sufficient amounts of chemi- or physi-absorbed substances on the surface which may be converted to gas upon localized heating.

Regardless of the specific materials from which the spacer layer is constructed, it is further appreciated that the spacer layer may be transparent so as to maximize reflection from the underlying reflectorized layer, or alternatively, may be dyed to promote absorption of radiation passed through the absorbing layer within the spacer layer and thereby maximize the production of gaseous products therein.

The light absorbing layer utilized in the media of the present invention comprises a refractory material, i.e. one having a high melting point. For the purpose of the present invention, such a material may be defined as one having a solid state at 1,700 Kelvin. Thus, if the refractory material does not actually melt, but rather, sublimes, the phrase "melting point" simply indicates the temperature at which the material no longer exists in the solid state. In contrast to such media, the pit or hole forming media of the prior art is required to melt at relatively low temperatures, the lower the better, in order that the material may be evaporated or ruptured to form the resultant pit or hole at as low a power level as possible. In the present invention, the refractory material is deformed without melting, and it has been found that the higher the melting point thereof, the better, the highest melting point materials typically exhibiting the highest range of recording latitude. Moreover, such refractory materials typically exhibit a high degree of chemical stability. This is significant in that the media retain substantially the same degree of sensitivity over prolonged exposures, thus enabling subsequent recordings to be made over extended periods of time. Similarly, the optical characteristics of the media do not significantly change, such that the recorded information in the form of reflection maxima and minima remain substantially unchanged over extended periods of time and exposure. While the higher melting point refractory materials are thus preferred, it is also recognized that lower melting point refractory materials, such as several silicides, may be preferred due to their ease of coating, stability, etc.

In various embodiments of the present invention, therefore, the refractory material used in the light-absorbing layer is preferably either amorphous carbon, boron, or silicon, or alloys therebetween. In a somewhat broader sense, the refractory material may further be selected from the group consisting of borides of Hf, Nb, Ta, Ti, W and Zr, nitrides of B, Hf, Ta, Ti and Zr, carbides of Al, Hf, Nb, Ta, Ti, V, W and Zr and oxides of Ce, Hf, Mg, Th and Zr, i.e., those borides, nitrides, carbides and oxides having a melting point in excess of 3000 K, and silicides of Nb, Ta, Ti and W, i.e., those silicides having a melting point in excess of 2300 K.

In a yet broader sense, the refractory material may be selected from a wide list of known refractory compounds, alloys, solid solutions, and the like, binary, ternary, etc. In particular, such multi-component compositions as may contain varying amounts of carbon and oxygen are known to be desirable.

It is desirable to promote the adhesion of the optical recording tri-layer construction to the substrate, while at the same time improving the environmental stability and uniformity of the resultant medium. For that purpose, a nucleation or adhesion promoting layer such as the layer 26 shown in FIGS. 2 and 3, are desirably provided. Such a layer prevents blotchy, non-uniform deposition of the recording materials which is often caused by non-uniform sticking coefficients due to imperfectly cleaned or non-uniform substrates.

A further desirable aspect of the present invention is that the recorded medium, wherein the information is recorded in the form of a plurality of protuberances formed on the outer surface, is directly replicable by placing the surface containing protuberances in contact with a polymeric material or precursor thereof to form replicas of the protuberance pattern on the surface of that polymeric material. In a preferred embodiment, such replicas are preferably made by roll-coating a bead of liquid resin on the surface bearing the protuberances and subsequently curing the resin in situ, after which the adhered resin layer is removed from the master surface. It has further been found that the protuberances are sufficiently mechanically stable to enable the recorded media to be used as a master wherein the protuberant surface is directly impressed into a softened polymeric sheet. The resultant information bearing surface of the replica is thus characterized by dimples or recesses in the surface corresponding to the protuberances in the originally formed information record. If the replica is to be used in playback in a reflective mode, the surface may then desirably be coated with a thin metallic reflecting layer.

Figure 4:
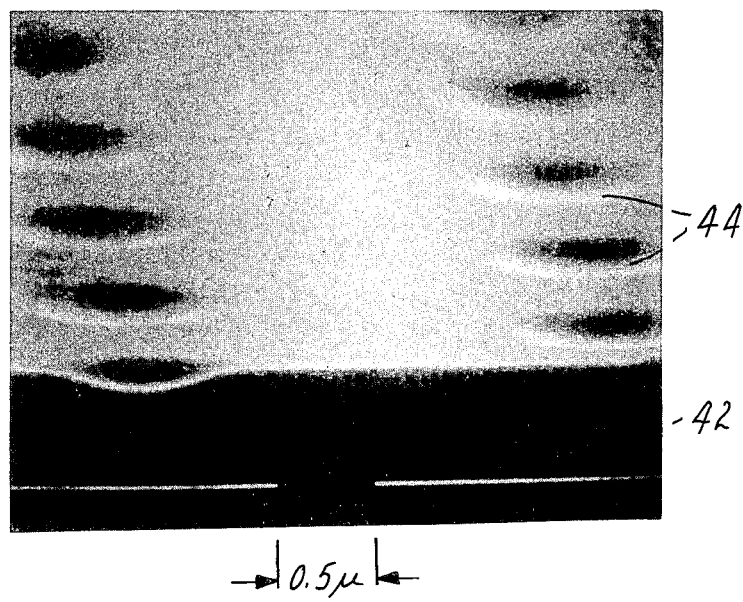
FIG. 4 is a scanning electron micrograph of a replica of a medium like that shown in FIGS. 2 and 3, wherein information was recorded therein as a series of protuberances along parallel tracks.

FIG. 4 is a scanning electron micrograph of a section of such a replica of the medium shown in FIGS. 2 and 3, formed of an acrylate resin 42 into which a plurality of protuberances were impressed to form the dimples 44, and on which a 20 nm gold film was sputtered to enable SEM. The replica was sectioned along the diameter of one of the dimples corresponding to a protuberance formed in the master information record. As may there be seen, the diameter of the resultant dimples is approximately 1 micron, and the depth therein, i.e. the height of the original protuberances, approximately 120 nm. It may there be noted that the dimples, like those of the original protuberances are characterized by a extremely smooth profile, thus providing a high carrier-to-noise ratio, as well as ensuring a high ease of replication.

While a trilayer construction, including a reflector, a spacer, and an absorbing layer so as to provide interferometric dimensions, may be preferred in certain embodiments, both bilayer and monolayer constructions may similarly be utilized. Thus, for example, a protuberant forming medium constructed according to the present invention may include a substrate, a spacer layer of suitable refractive index, and a light absorbing layer thereover. In such an embodiment, the index of refraction of the spacer layer is selected to provide the appropriate interferometric dimensions when the spacer and absorber layer are considered in combination. The incident radiation would then be directed through a transparent substrate onto the spacer and absorber layers. An alternative bilayer construction may include a substrate having a reflectorized layer thereon and an absorber layer applied directly to the reflectorized layer. In this case the index of refraction of the absorber layer and its equivalent optical thickness is tailored to provide interferometric dimensions when considered together with the reflectorized layer.

A further alternative construction of the medium of the present invention may also include a single absorbing layer applied directly to the substrate. As in the dual layer construction, such a layer is desirably selected to have an equivalent optical thickness so as to maximize absorption and minimize reflection.

The common aspect of all of the various embodiments noted above is that the light-absorbing layer is selected of a refractory material having a sufficient degree of plasticity such that upon localized impingement of a laser beam the protuberances are formed in the absorbing layer as a result of the formation of gaseous products at the interface between the under surface of the absorber and the layer therebeneath.

The optimum thickness of the light-absorbing layer varies depending upon the specific properties of the material selected, as well as upon the particular uses to be given to the resulting recording medium. Typically, such thicknesses are desirably maintained below 60 nanometers and above approximately 5 nanometers. If such layers exceed approximately 60 nm, such as being in the order of 100 nm, the bulk properties of the refractory materials begin to dominate, and the layer loses the requisite degree of plasticity necessary to form the protuberances at reasonable energy levels, or becomes sufficiently brittle that the material fractures and forms pits or holes as opposed to protuberances. Further, the optical reflectivity from the surface increases to that associated with bulk materials, and the interferometric properties desirably obtained as the result of the combination of the absorbing layer and the spacer layer are lost, with an attendant decrease in sensitivity. On the other side of the thickness range, if the material becomes less than approximately 5 nanometers thick, efficient optical absorption is lost, and the material is so fragile as to prevent the production of mechanically stable protuberances. In both extremes, the resultant carrier to noise ratio is significantly lower than that obtained within the desired ranges. Where carbon is utilized as the absorbing layer, a preferred range of thickness has been found to be 7.5–30 nm.

The present invention will be more readily understood by reference to the following examples. However, these examples are only illustrative in nature and are not to be construed to limit the scope of the invention.

EXAMPLE 1

An optically polished glass disc about 35 cm in diameter and about 1 cm thick was selected for the substrate. The glass disc was thoroughly degreased and dewaxed by submerging it in a mixture of trichloroethylene/acetone in a glass container. The glass disc was then spray rinsed in succession by acetone, ethanol (200 proof) and deionized water.

Subsequent to the above cleaning and in preparation for hot ultrasonic cleaning, the glass disc was warmed in tap water to reduce thermal shock. Using rubber padding, the glass disc was then placed in an ultrasonic cleaner and ultrasonically cleaned for 30 minutes in a 400 ml/40 liter mixture of a commercial detergent and deionized water at an elevated temperature. Upon removal from the ultrasonic cleaner, the disc was placed flat on a clean, relatively lint free surface, washed lightly with cotton gauze and detergent, and rinsed with deionized water. The glass disc was then placed on a tripod such that the flat surfaces were slightly slanted. Another complete rinse of the glass disc was accomplished using filtered deionized water followed by ethanol (200 proof). The disc was then blow-dried by a stream of filtered nitrogen gas.

A thin layer of titanium suboxide was next sputter deposited onto the cleaned glass disc to function as the nucleation, adhesion promoting layer. The layer was formed by magnetically assisted sputtering from a Ti target in an atmosphere of argon, water vapor, and oxygen. The background pressure of water vapor and oxygen results in the formation of the suboxide. Satisfactory results were obtained by sputtering for 10 to 15 minutes using a target current of 0.50 amperes at a pressure of about 0.40 Pa, thus resulting in a layer approximately 3 nm thick.

The adhesion promoting titanium suboxide layer was cleaned via glow discharge in oxygen for 5 minutes, at an oxygen pressure of 0.77 Pa, discharge current 120 mA and discharge voltage 2.6 kV. A reflector layer of about 30 nm of aluminum was next applied by vacuum evaporation, using a 0.015 inch (380 $\mu$m) thick tungsten boat, and a background pressure of about $5.3 \times 10^{-4}$ Pa, such that the deposition rate at the substrate was approximately 2 nm/sec. The aluminum reflector layer had a film resistance of about 1 ohm/square and an optical reflectivity of about 90 to 92% at a wavelength of 632 nm.

A diode-type RF (13.56 MHz) plasma generation unit with a 40 cm diameter cathode at a cathode-to-substrate spacing of 8 cm was utilized to plasma deposit a $30 \pm 5$ nm thick methylmethacrylate optical spacer layer onto the exposed Al layer. The monomer feed mixture, composed of 0.985 vapor fraction methylmethacrylate and 0.015 vapor fraction acrylic acid, was introduced at a mass flow rate of about $4 \times 10^{-4}$ g/sec, whereas the argon mass flow rate was about $3 \times 10^{-5}$ g/sec. A plasma polymerizing power of about 55 W was used which corresponds to a power density of about 4.5 kW/m$^3$ and a power flux of about 450 W/m$^2$.

Electron beam evaporation (beam voltage 10 kV, beam current 0.15 A, background pressure $2 \times 10^{-4}$ Pa) was employed to deposit an absorbing layer of carbon 15 nm thick onto the optical spacer layer. At these conditions and a 50 cm source-to-substrate distance, a deposition rate of about 0.15 nm/sec occurred. The optical transmission of the carbon layer was about 50% at a wavelength of 500 nm.

The trilayer construction deposited under the above conditions thus corresponds to the medium shown in FIGS. 2 and 3, and had a reflection minimum at an optical wavelength of 500 nm. When the medium was mounted in a laser recorder and rotated at 1800 rpm, and a 10 Mhz pulse modulated coherent optical beam of radiation at a wavelength of 515 nm was focused thereon, information bearing, optically detectable, protuberances were formed in the carbon layer at a peak pulse power of approximately 7.5 mW. The recording latitude of the construction was further evident in that protuberances were formed at incident peak pulse power levels up to 100 mW. Using a 633 nm coherent optical beam of radiation to read, the recorded information bearing protuberances were easily discerned from the unrecorded regions by the differential reflection which they produced. Carrier-to-noise (C/N) ratios of 50 dB were easily obtained. Such high C/N ratios are particularly desirable for analog recording applications such as in recording video signals.

In order to provide accurate comparisons between various media, the carrier-to-noise measurements referred to in this and in the remaining examples were made using a Hewlett-Packard Model No. 8568A Spectrum Analyzer under the following conditions. The optical playback signal was first converted into a corresponding electrical signal which was coupled to the spectrum analyzer, and the analyzer was set to sweep the frequency range from 100 KHz to 25 MHz at a resolution band width of 30 KHz. The carrier-to-noise (C/N) ratio is here defined as the ratio between the rms power of the fundamental 10 MHz recording (carrier) frequency and the broad band noise level near the fundamental frequency. It should be appreciated that the C/N ratios as thus defined are conservatively based, and would be considerably higher if the resolution bandwidth was reduced, for example to 3 KHz, or by analyzing the total signal power, as opposed to that of the fundamental frequency alone.

Examples 2–7 demonstrate the suitability of various refractory materials in the present invention, and were prepared and tested under the same conditions as those set forth in Example 1 above except as set forth in Tables 1 and 2 below, respectively. The structure and properties of Example 1 are included for ease of comparison.

TABLE 1

| Example No. | Substrate | Primer Layer and Thickness | Reflecting Layer and Thickness | Optical Spacer Layer and Thickness | Light-Absorbing Layer and Thickness |
|---|---|---|---|---|---|
| 1 | glass | TiO$_x$; 3 nm | Al; 30 nm | PMMA; 30 nm | C; 15 nm |
| 2 | 1 | 2 | 1 | 1 | B; 15 nm$^3$ |
| 3 | 1 | 2 | 1 | 1 | Si; 7 nm$^3$ |
| 4 | 1 | 2 | 1 | 1 | B$_4$C; 12 nm$^3$ |
| 5 | 1 | 2 | 1 | PMMA; 59 nm$^4$ | SiB$_6$; 130 nm$^3$ |
| 6 | 1 | 2 | 1 | PMMA; 45 nm$^4$ | SiC; 13 nm$^3$ |
| 7 | 1 | 2 | 1 | PMMA; 250 nm$^5$ | C; 15 nm |

[1] The same respective layers, thicknesses, conditions, etc. as in Example 1.

[2] The same respective materials and conditions were utilized as in Exhibit 1, however the deposition time was only one minute.

[3] The respective absorbing layers were deposited by electron beam evaporation of the indicated materials in graphite crucibles, and may contain varying amounts of carbon and oxygen.

[4] A thicker optical spacer layer was selected such that the reflection minimum was at a wavelength approximately equal to that of the readout light beam.

[5] This significantly thicker optical spacer layer was selected to provide improved thermal isolation of the light absorbing layer to thereby increase the sensitivity. It also resulted in the spacer layer in combination with the absorbing layer having an effective optical thickness corresponding approximately to multiple interferrometric orders. When the thickness of the spacer layer is appropriately adjusted, the plurality of reflection minima likewise enables efficient optical record and readout using light beams at a multiplicity of wavelengths.

TABLE 2

| Example No. | Optical Transmission of the Absorbing Layer | Reflection Minimum | Recording Latitude (mW) | Obtainable C/N (db) |
| --- | --- | --- | --- | --- |
| 1 | 50 ± 5% @ 500 nm | 500 nm | 7.5–100 | 50 |
| 2 | 58 ± 5% @ 500 nm | 550 nm | 8–10 | 60 |
| 3 | 58 ± 5% @ 500 nm | 500 nm | 4–5 | 40 |
| 4 | 72 ± 5% @ 500 nm | 500 nm | 6–8 | 50 |
| 5 | 57 ± 5% @ 500 nm | 675 nm | 4–7 | 65 |
| 6 | 48 ± 5% @ 500 nm | 650 nm | 10–15 | 60 |
| 7 | 57 ± 5% @ 500 nm | 520 & 560 nm[4] | 6–15 | 60 |

[4] Multiple reflection minima.

EXAMPLE 8

A polished glass substrate was cleaned, coated with an adhesion promoting layer and a reflector layer as described in Example 1. An optical spacer layer was deposited to a thickness of approximately 35 nanometers by spin coating a polymer mixture consisting of 40 weight percent tetrahydrofuran, 1.5 wt.% of a curing agent such as an oxylanolene segments, 6 wt.% trichloroethylene, and 52.5 wt.% toluene onto the reflector-bearing substrate at a spinning speed of 270 revolutions per minute. The curing agent is particularly desirably composed of poly-2,5-oxolane, such as is described in U.S. Ser. No. 803,207 filed June 3, 1977. This mixture was applied while the disc was running, and the resultant coating was subsequently heated to 100 degrees C. for 5 to 6 minutes in a vacuum at approximately $1.3 \times 10^{-3}$ Pa to crosslink the oxylanolene segments. A 15 nm light-absorbing layer of C was then deposited as in Example 1. When the resultant trilayer construction was exposed to a pulsed, modulated laser beam focused on the absorbing carbon layer, playable and replicatable information bearing protuberances were similarly formed at peak powers above approximately 5 mW.

EXAMPLE 9

A polished glass substrate was cleaned and coated with an adhesion promoting layer as in Example 1. A 45 nm thick aluminum reflector layer was then deposited on the primed surface by magnetically assisted sputtering under the following conditions:

| | |
| --- | --- |
| Argon mass flow rate: | 4.0 mg/sec |
| Target power: | 2.8 kW |
| | 10 A |
| | 440 VAC, single phase 0.64 power factor |
| Sputtering pressure: | 1.6 Pa argon pressure |
| Background pressure: | $<1.3 \times 10^{-3}$ Pa |

The aluminum reflector layer had a resistivity of about 0.5 ohms/square and an optical reflectivity of about 92% at a wavelength of 632 nm.

To aid in the optical absorption of the recording radiation, a dye was added to the spacer layer. A dye-polymer mixture consisting of 0.10 wt.% disulfone magenta, 40.0 wt.% tetrahydrofuran, 1.5 wt.% of a curing agent consisting of a polymer containing oxolanylene segments, 6 wt.% trichloroethylene and 52.4 wt.% toluene was spin coated onto the reflectorized surface and subsequently heated to crosslink the curing agent as in Example 8.

The absorbing layer was produced by magnetically assisted sputter depositing from a target of tungsten/-titanium. Sputtering for 5 minutes 40 seconds at a deposition current of 0.50 amp and a 1.6 Pa argon pressure produced a layer of 74% W and 26% Ti, in which the optical transmissivity was 55% at 500 nm and the resistivity was about 5000 ohms/square.

Under the conditions used in Example 1 for recording and readout, optically detectable information bearing protuberances were formed at a threshold peak pulse power level of 5 mW.

EXAMPLE 10

A polished glass substrate was cleaned, coated with an adhesion promoting layer and reflector layer as described in Example 1.

The optical spacer layer was again produced by spin coating. A solution of poly (alpha-methylstyrene) in toluene was filtered through a 5.0 micrometer pore size filter membrane. The solution was poured onto the reflectorized substrate from a pipette while the substrate was spinning at 270 rpm. The excess solution was spun off the substrate and the toluene allowed to evaporate while spinning resulting in a thin film of poly (alpha-methylstyrene) having a thickness of 250±20 nm.

An absorbing layer of $TaO_xN_y$ was deposited by reactive magnetically assisted sputtering under the following conditions:

A tantalum target was sputtered in an atmosphere of controlled argon and nitrogen pressure and flow rate. The background pressure in the vacuum system was less than $1 \times 10^{-5}$ torr. The nitrogen pressure and flow rate were $2 \times 10^{-4}$ torr and 0.075 torr-liter/sec. respectively. The argon pressure and flow rate were $3 \times 10^{-3}$ torr and 0.75 torr-liter/sec, respectively. The power density on the tantalum target was 2.2 w/cm². Film deposition time was 14 minutes. The optical transmission of the predominantly Ta absorbing layer was 47–50%.

The resulting trilayer construction exhibited reflection minima at optical wavelengths of 515 nm and 1550 nm. When a 10 MHz peak pulse modulated laser beam of 515 nm radiation was focused on this trilayer construction, optically detectable information bearing protuberances were formed in the absorbing layer at peak power levels ranging between 5–15 mW incident on the surface.

EXAMPLE 11

A polished glass substrate was cleaned, coated with an adhesion promoting layer, a reflector layer, and an optical spacer layer as described in Example 1.

A light-absorbing layer of $Zr$-$ZrO_x$ was deposited in two steps by electron beam evaporation of zirconium in a carbon crucible, the outer annular region being coated at a rate of 0.05 nm/sec to a thickness of 13 nm and the inner annular region at a rate of 0.6 nm/sec to a thickness of 9 nm. The optical density of the resultant film coated at the 0.05 nm/sec rate was lower than that of the film coated at the 0.6 nm/sec rate, even though the total thickness was greater. ESCA analysis revealed that the film coated at 0.05 nm/sec had a higher oxygen concentration than the film coated at 0.6 nm/sec. It was concluded that both filsm contained significant amounts of oxygen.

The trilayer construction exhibited minimum reflection at an optical wavelength of 375 nm in the regions where the absorbing layer was deposited at 0.6 nm/sec. and a minimum reflection at 425 nm in the regions where the absorbing layer of zirconium was deposited at 0.05 nm/sec.

When a 10 MHz peak pulse modulated laser beam of 515 nm radiation was focused on this trilayer construction, optically detectable information bearing protuberances were formed in the absorbing layer at peak power levels ranging between 6–12 nW. When the information was read out as described in Example 1, carrier-to-noise ratios of 48 and 60 dB were obtained from the regions characterized by the low and high rate depositions respectively.

EXAMPLE 12

A polished glass substrate was cleaned and coated with an adhesion promoting layer and reflecting layer as described in Example 1. The optical spacer layer was eliminated. An absorbing layer of carbon was deposited as described in Example 1 to a thickness of 36 nm.

The bilayer construction deposited under the above conditions produced a minimum reflection at an optical wavelength of 500 nm. When a 10 MHz peak value modulated laser beam of 515 nm radiation was focused on the bilayer construction, optically detectable information bearing protuberances were formed in the carbon layer at peak power levels ranging between 25–100 mW incident on the surface. When the information was read out as described in Example 1, carrier-to-noise ratios greater than 45 db were obtained.

EXAMPLE 13

A polished aluminum substrate was cleaned and spin-coated with a 4.5±0.2 micrometer thick, radiation-curable, acrylated epoxy resin layer to provide thermal isolation and a source of a gas upon localized heating.

No adhesion promoting layer, reflecting layer, or optical spacer layer was used.

An absorbing layer of carbon was deposited as described in Example 1 to a thickness of 15 nm.

When a 10 MHz peak pulse modulated laser beam of 515 nm radiation was focused on the construction, optically detectable information bearing protuberances were formed in the carbon layer at peak power levels ranging between 20–40 nW incident on the surface.

EXAMPLE 14

A polished glass substrate was cleaned and coated with a reflector layer, an optical spacer, and an absorbing layer, as described in Example 1. The thicknesses were 17, 30 and 13 nm, respectively. The adhesion promoting layer was 3 nm of $CrO_x$ deposited from a Cr target in the same manner as that used for the $TiO_x$ layer described in Example 1.

The resulting trilayer construction produced minimum reflection at an optical wavelength of 500 nm.

In testing the medium of Example 14, an FM video signal was added to modulate a coherent optical beam of radiation at a wavelength of 515 nm and the modulated radiation was focused on the trilayer construction to form video information bearing, optically detectable protuberances in the carbon layer at peak pulse power levels ranging between 15–30 nW. The NTSC signal-to-noise (S/N) ratio of the input signal was 48 dB. The video information was readout as described in Example 1. The NTSC signal-to-noise ratio of the video information read from the trilayer construction was 41–45 db.

A video information carrier such as shown in FIG. 4, was formed by replicating the protuberances in the surface of the trilayer master in the following manner: A bead of resin was applied near one edge of the surface of the carbon layer and was roll coated between the information bearing protuberances of the master and a transparent replica substrate, the transparent substrate being placed over the master and under a pressure roller positioned at the resin edge of the master. A uniform coating between the replica substrate and the master was then produced by advancing the roller, causing the liquid resin to uniformly fill the volume between the master and the replica substrate.

The thickness of the information bearing coating may be controlled by varying the interrelationship of the viscosity of resin, the weight of roller and the relative speed of motion between the roller and the master. Coating thickness can also be controlled by the use of an air cylinder attached to the roller and set at a proper pressure. The depth of the relief pattern in the information bearing coating is controlled by the height of the protuberances in the trilayer master and, in fact, is substantially an exact replica thereof.

Photopolymerization and curing of resin coating occurs on exposure of the resin to a source of actinic radiation. Suitable sources of radiation include mercury, xenon, carbon arc and tungsten filament lamps, sunlight, etc. Exposures may be less than one second to ten minutes or more, depending upon the amounts of the particular photopolymer materials, the radiation source, distance from the source, thickness of the material being polymerized and the substrate material being utilized.

In Example 14, the resin was a mixture of 50 parts by weight of hydantoin hexacrylate (1,3-bis[3-2(2-acryloyoxyethoxy)-2-hydroxypropyl]-5,5-dimethyl-2,4-imidizolidinedione), 50 parts by weight of hexanediol diacrylate, and 2 parts by weight of a photoinitiator such as 2,2-dimethoxy-2-phenyl-acetophenone, typically like IRGACURE 651 manufactured by Ciba-Geigy.

The transparent replica substrate was a sheet of 1 mm thick PVC.

The resultant laminated structure comprised of the information bearing coating and the substrate was then peeled from the trilayer master. Such a laminated structure may be produced with good adhesion from a variety of substrates, including ICI Melinex 505 ® polyester (PVDC) primed polyester, plasma etched or microstructured surfaces of PMMA, PVC and other appropriately primed suitable substrates. Additional processing of the replica is then determined according to the system utilized for playback.

In Example 14, the replica was coated with 30 nm of Al and played back in a reflective optical video disc player. The NTSC signal-to-noise ratio of the replica was 41–45 db.

It may be noted that in the Examples set forth above the recording latitude indicated for the carbon containing recording medium set forth in Example 1 is significantly greater than that obtained in the remaining examples. In the examples wherein the light-absorbing layer was also formed of carbon, it is believed that a similarly broad recording latitude exists, whereas the range of according levels set forth for the non-carbon containing examples reflects the actual observed recording latitude. The wide recording latitude exhibited in the carbon containing medium of Example 1 as opposed to that of the non-carbon containing media further supports the belief that the higher the melting point of the particular refractory material used in the absorbing layer, the greater according latitude.

While not specifically mentioned hereinabove, it is further appreciated that the recording medium of the present invention may be provided with a protective overcoat which is not destroyed during recording and which thus prevents dust, such as may be present either prior to the recording process or which may accumulate thereafter from degrading the carrier-to-noise ratio.

While the principles of the present invention have been demonstrated with particular regard to the Examples set forth above, it will be recognized that various departures from such illustrative examples may be undertaken in the practice of the invention. For example, the substrate itself may be formed organic or inorganic materials, and may be either of transparent materials, or formed of materials having a high reflectivity, thus eliminating the need for a separate reflecting layer underlying the absorptive layer. For another example, since wide band reflection is not required by the reflecting layer, the metal coating may be replaced by a multilayer (or even a single layer) dielectric reflector.

We claim:

1. A recording medium for use with a focused laser beam, said recording medium having a substrate and a light-absorbing layer adjacent thereto for absorbing light from the laser beam is localized regions to thereby provide information storage, wherein in the improvement said light-absorbing layer comprises amorphous carbon having a thickness of less than 60 nm and a plasticity sufficient to allow plastic deformation upon localized heating resulting from impingement by said laser beam to enable the formation of localized protuberances which can subsequently be optically detected.

2. A recording medium according to claim 1, further comprising a reflecting layer between said substrate and said light-absorbing layer, and wherein the total optical thickness of the absorbing layer is approximately $m\lambda/4n$, where m is an integer, n is the effective index of refraction of the layer through which light passes, and $\lambda$ is the wavelength of the light, such as to result in an interferometric, substantially antireflecting structure when in the undeformed state, and wherein the subsequently formed protuberances possess appreciably increased effective optical thickness.

3. A recording medium according to claim 2, wherein said reflecting layer comprises a thin film of a material selected from the group consisting of aluminum, gold, and silver.

4. A recording medium according to claim 2, further comprising an optical spacer layer between said reflecting layer and said light-absorbing layer, which in combination with said light-absorbing layer provides said interferrometric antireflecting structure.

5. A recording medium according to claim 4, wherein said optical spacer layer comprises a substantially transparent film, and said light absorbing layer and said transparent optical spacer layer in combination have an effective optical thickness corresponding approximately to multiple interferometric orders so as to effect efficient light absorption during said laser beam impingement.

6. A recording medium according to claim 4, wherein said light-absorbing layer comprises a layer of amorphous carbon having a thickness in the range of 7.5 to 30 nm.

7. A recording medium according to claim 4, wherein said optical spacer layer is formed of a polymeric material substantially transparent to said light.

8. A method for recording information in a thin film recording medium, comprising the steps of
    (a) providing a recording medium having a substrate and a light-absorbing layer adjacent thereto, said layer including amorphous carbon and having a thickness of less than 60 nm and a plasticity sufficient to allow plastic deformation upon localized heating,
    (b) exposing said medium to a focused laser beam of limited power and duration to cause absorption of light therefrom in localized regions, and
    (c) deforming said absorbing layer as a result of said light absorption to form optically detectable protuberances at said localized regions.

9. A method for recording information according to claim 8, wherein said providing step further comprises providing a reflecting layer between said substrate and said light-absorbing layer, the total optical thickness of the absorbing layer being approximately $m\lambda/4n$, where m is an integer, n is the effective index of refraction of the absorbing layer through which light passes, and $\lambda$ is the wavelength of the light, such as to result in an interferometric, substantially antireflecting structure when in the undeformed state, and wherein said protuberances process appreciably increased effective optical thickness.

10. A method of recording information according to claim 9 wherein said providing a reflecting layer comprises providing a thin film of a material selected from the group consisting of aluminum, gold, and silver.

11. A method of recording information according to claim 9, wherein said providing step further comprises providing an optical spacer layer between said reflecting layer and said light-absorbing layer, which in combination with said light-absorbing layer provides said inteferrometric antireflecting structure.

12. A method of recording information according to claim 11, wherein the step of providing said optical spacer layer comprises providing a substantially transparent film, said light-absorbing layer and said transparent optical spacer layer in combination having an effective optical thickness corresponding approximately to multiple interferrometric orders so as to effect efficient light absorption during said laser beam impingement.

13. A process for replicating information records comprising the steps of
    (a) providing a recording medium having a substrate and a light-absorbing layer adjacent thereto for absorbing light, wherein said light-absorbing layer comprises amorphous carbon having a thickness of less than 60 nm and plasticity sufficient to allow plastic deformation upon localized heating to enable the formation of localized protuberances which can subsequently be optically detected,
    (b) exposing said medium to a focused laser beam of sufficient duration and power to form on a surface of said light-absorbing layer a plurality of optically detectable localized protuberances, which protuberances form a pattern representing information recorded therein, and (c) placing said surface containing said protuberances in surface contact with a polymeric material or precursor thereof to form replicas of said protuberant pattern on a surface of said polymeric material.

14. An information record for use with playback apparatus employing a playback light beam, said information record having a substrate and adjacent thereto a light-absorbing layer comprising amorphous carbon having a thickness of less than 60 nm, a plasticity sufficient to allow plastic deformation upon localized heating, and a plurality of optically detectable localized protuberances representing recorded information.

15. An information record according to claim 14, further comprising a reflecting layer between said substrate and said light-absorbing layer, and wherein the totoal optical thickness of the absorbing layer is approximately $m\lambda/4n$, where m is an integer, n is the effective index of refraction of the layer through which light passes, and $\lambda$ is the wavelength of the light, such as to result in an interferometric, substantially antireflecting structure in the undeformed regions, and wherein the localized protuberances possess appreciably increased effective optical thickness.

16. An information record according to claim 15, wherein said optical spacer layer comprises a substantially transparent film and said light-absorbing layer and said transparent optical spacer layer in combination have an effective optical thickness corresponding approximately to multiple interferometric orders to as to effect efficient light absorption at more than one wavelength to thereby enable said protuberances to be efficiently formed during laser beam impingements at a multiplicity of wavelengths, and to effect efficient readout using said playback light beam at a multiplicity of wavelengths.

17. An information record according to claim 15 wherein said protuberances are characterized by a peak height above the non-protuberant regions such that the interferrometric antireflecting conditions are no longer satisfied, resulting in increased average light reflection from the protuberant regions during reproduction with said playback light beam.

18. An information record according to claim 15 wherein said protuberances are characterized by a height sufficient to appreciably alter said interferrometric antireflecting conditions and by an overall fine grain and surface smoothness and gradually changing cross section such that said record is directly and readily useful as a master for forming at least five replicas without appreciable degradation in the information record represented by the replicated protuberances.

* * * * *